INVENTOR.
D. E. LUPFER
BY Hudson & Young
ATTORNEYS

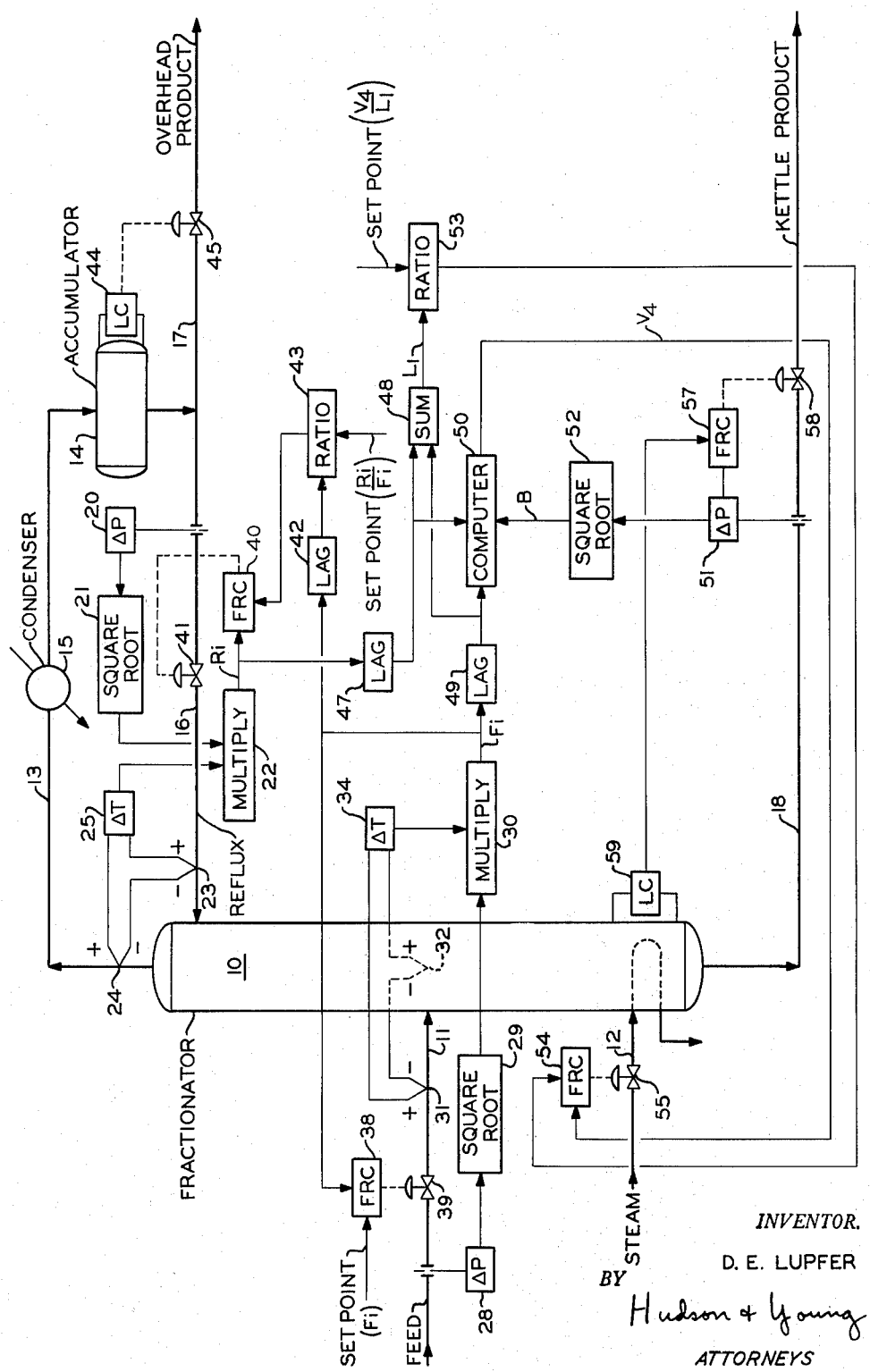

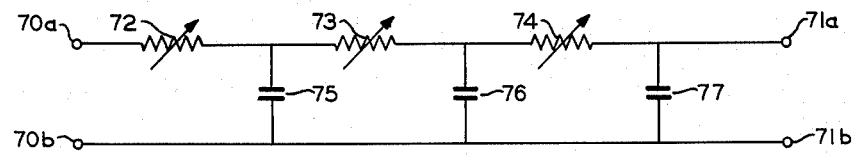
FIG. 4
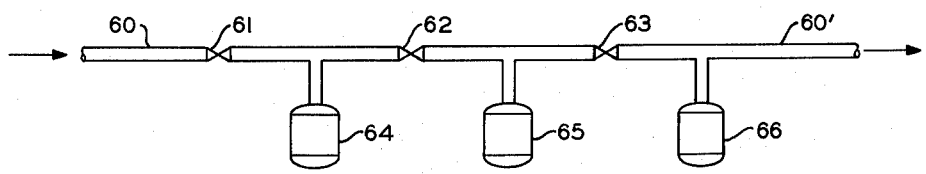
FIG. 3
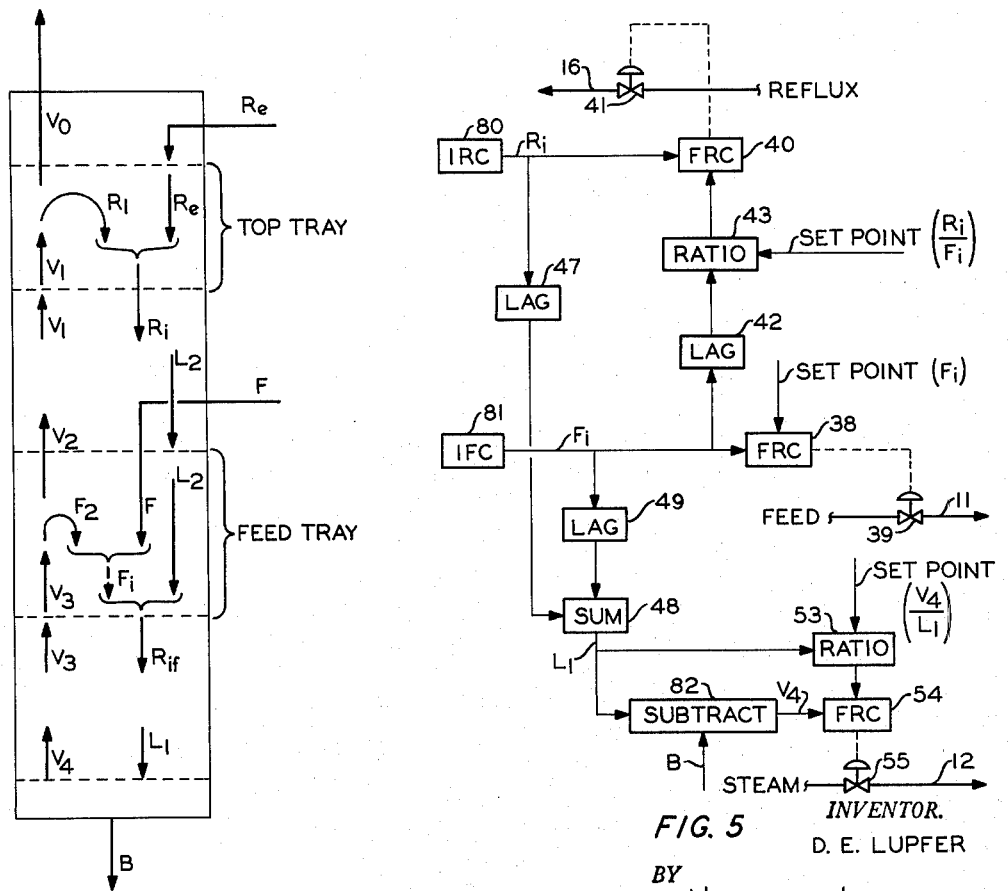
FIG. 2
FIG. 5
INVENTOR.
D. E. LUPFER
BY
Hudson & Young
ATTORNEYS

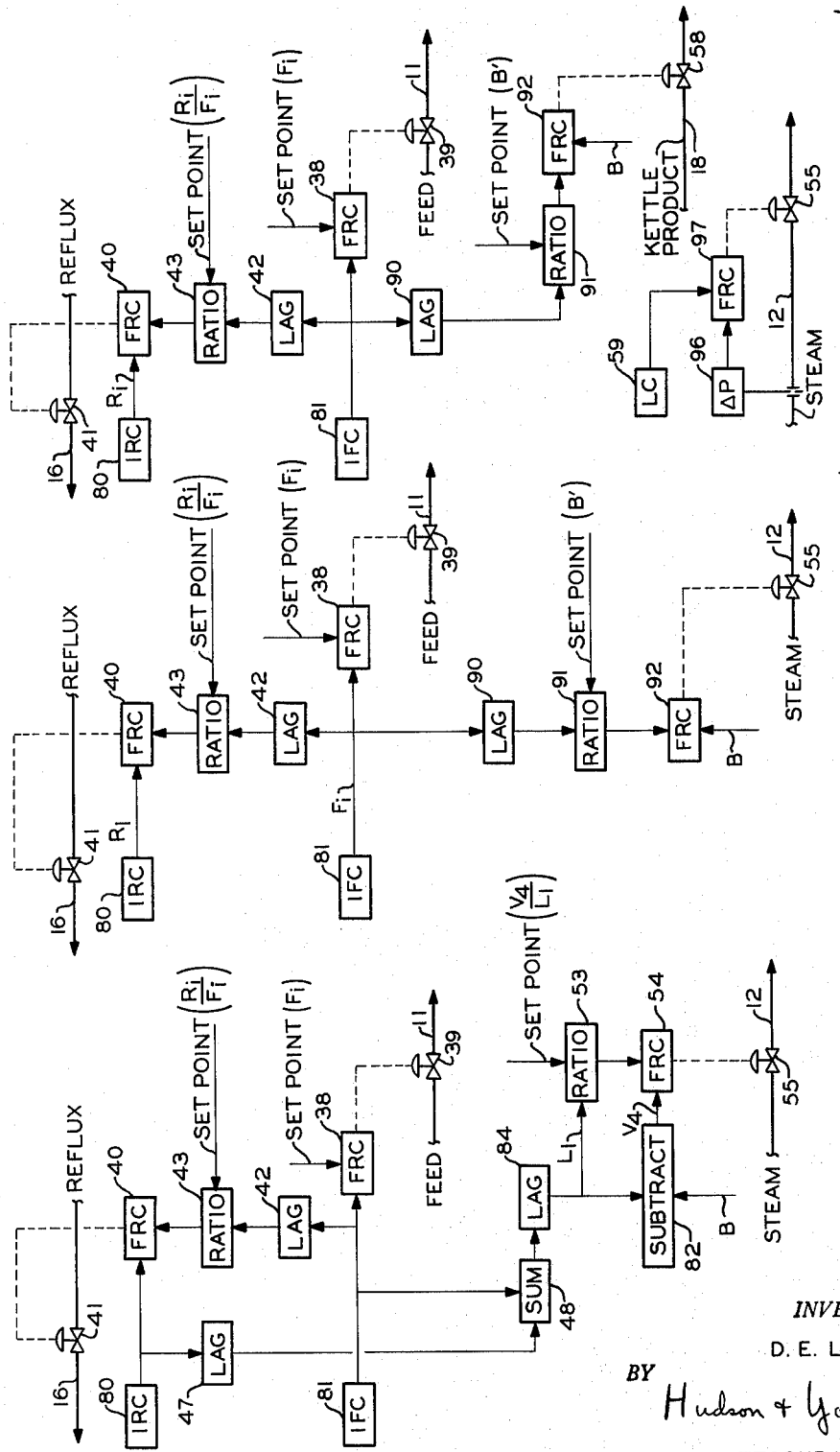

RESULTS WITH CONTROL

RESULTS WITHOUT CONTROL

RESULTS WITH CONTROL

RESULTS WITHOUT CONTROL

INVENTOR.
D. E. LUPFER
BY Hudson & Young
ATTORNEYS

# United States Patent Office 3,224,947
Patented Dec. 21, 1965

3,224,947
APPARATUS FOR CONTROLLING VAPOR-LIQUID FLOW RATIOS WITHIN A FRACTIONATION COLUMN
Dale E. Lupfer, Bartlesville, Okla., assignor to Phillips Petroleum Company, a corporation of Delaware
Filed June 19, 1961, Ser. No. 118,066
20 Claims. (Cl. 202—160)

This invention relates to control systems for regulating the operation of fractionation columns.

It is common practice in the petroleum and chemical industries to separate fluid mixtures by distillation. Various types of fractionation columns have been devised for this purpose. Many of these columns are provided with a plurality of trays which are spaced vertically from one another. The fluid mixture to be separated is introduced into the column and heat is applied to the lower region of the column to vaporize liquids. A first product stream comprising the lower boiling constituent or constituents of the fluid mixture is removed from the top of the column, and a second product stream comprising the higher boiling constituent or constituents is removed from the bottom of the column. The overhead vapor is condensed and a portion returned to the column as external reflux.

Whenever possible, fractionation columns are operated so that the feed mixture to be separated is introduced into the column at a constant temperature. The feed is often passed in heat exchange relationship with the kettle product to elevate the temperature of the feed from the heat which is available in the kettle product stream. However, it is not always possible to maintain the temperature of the feed constant at a desired value. For example, a sudden change in the rate of flow of the kettle product can change the temperature of the feed mixture supplied to the column. If the temperature of the feed should suddenly increase, for example, the amount of vapor condensed at the feed tray decreases so that the kettle product volume also decreases. This in turn lowers the temperature of the feed mixture which is passed in heat exchange relationship with the kettle product. An upset of this type can result in an oscillation being set up if an auxiliary control of the feed temperature is not capable of making rapid correction. As a practical matter, such auxiliary controls do not always produce the desired regulation so that poor temperature control is realized.

It is desirable that the feed rate to a fractionation column be maintained at a relatively constant value. However, this is not always possible when a plurality of fractionation columns are employed in series because each column must accept the entire product stream from the preceding column. When the feed flow rate is changed, an attempt is made to correct the operation of the column by adjusting the reflux rate and the heat supplied to maintain the desired separation. Heretofore, these adjustments have generally been made by operators without the benefit of a precise analysis of the product streams until laboratory analyses are subsequently made.

Another difficulty encountered in the operation of fractionation columns results from changes in the amount of cooling supplied to the overhead vapors. An increasing use has been made in recent years of fan coolers to condense these overhead vapors. With such a cooler, it is difficult to regulate the exact amount of cooling supplied. Sudden atmospheric temperature changes, such as may occur during a rainstorm, for example, result in the lowering of the reflux temperature. This causes an increase in the flow of liquid leaving the top tray because more of the vapor which enters this tray is condensed. The net result is an increase in overhead product purity at the expense of a decreased overhead product rate.

In accordance with the present invention, there is provided a control system which compensates for all or substantially all of the disturbances which are encountered in controlling fractionation systems. An ideal fractionation control system is one which maintains a predetermined ratio of vapor flow to liquid flow rates within the column. However, it is evident that measurements of this ratio can not be made directly. The present invention provides a system for computing the ratio of vapor to liquid flows within the column and for controlling the column operation to maintain this ratio at a preselected value. Such a control insures that the desired separation between constituents of the feed mixture will be made.

This computation of the vapor-liquid flow ratio is made from computations of the internal reflux and the internal feed within the column. Internal reflux is defined herein as the external reflux returned to the column plus the vapor which is condensed near the top of the column by subcooled external reflux. Internal feed is defined herein as the liquid feed supplied to the column plus the vapor which is condensed near the feed tray by subcooled feed. If the feed should enter the column at a temperature above that of the feed tray, the feed will actually vaporize liquid in the column so that the internal feed rate will be lower than the external feed rate.

Accordingly, it is the primary object of this invention to provide improved control systems for fractionation columns.

Another object is to provide a system for computing the ratio of liquid to vapor flows at a preselected region within a fractionation column.

Other objects, advantages and features of this invention should become apparent from the following detailed description, taken in conjunction with the accompanying drawing in which:

FIGURE 1 is a schematic representation of a first embodiment of the control system of this invention.

FIGURE 2 is a schematic representation of the vapor and liquid flows in a fractionation column.

FIGURE 3 is a schematic representation of a pneumatic lag means.

FIGURE 4 is a schematic representation of an electrical lag means.

FIGURE 5 is a schematic representation of a second embodiment of the control system of FIGURE 1.

FIGURE 6 is a schematic representation of a third embodiment of the control system of FIGURE 1.

FIGURE 7 is a schematic representation of a fourth embodiment of the control system of this invention.

FIGURE 8 is a schematic representation of a fifth embodiment of the control system of this invention.

Figure 9:
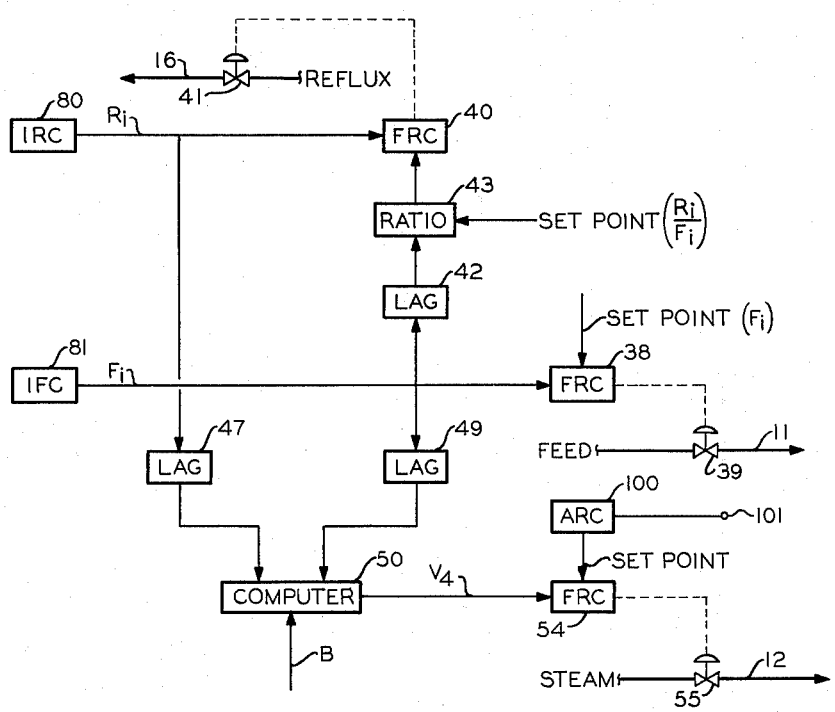
FIGURE 9 is a schematic representation of a sixth embodiment of the control system of this invention.

Referring now to the drawing in detail and to FIGURE 1 in particular, there is shown a conventional fractionation column 10 with is provided with a number of vapor-liquid contacting trays. A fluid mixture to be separated is introduced into column 10 through a conduit 11. Heat is supplied to the lower region of column 10 by the passage of steam or other heating medium through a conduit 12 which is in heat exchange relationship with column 10. Vapors are removed from the top of column 10 through a conduit 13 which communicates with an accumulator 14 through a condenser 15. A portion of the resulting condensate in accumulator 14 is returned to the top of column 10 as external reflux through a conduit 16. The remainder of the condensate is removed through a conduit 17 as the overhead product stream. A kettle product stream is removed from the bottom of column 10 through a conduit 18.

In order to explain the operation of the control system of this invention, an equation which is representative of the internal reflux in a fractionation column will be derived.

The material balance at the top tray of the fractionator can be expressed:

$$R_e + V_1 = R_i + V_o \qquad (1)$$

where $R_e$=mass flow of liquid entering top tray (external reflux)
$V_1$=mass flow of vapor entering top tray
$R_i$=mass flow of liquid leaving top tray (internal reflux)
$V_o$=mass flow of vapor leaving top tray These flows are illustrated schematically in FIGURE 2. The term $R_i$ is the sum of $R_e$ and vapor which is condensed at the top tray ($R_j$) by the subcooled external reflux.

The heat balance at the top tray can be expressed:

$$R_e h_e + V_1 H = R_i h_i + V_o H \qquad (2)$$

where $h_e$=enthalpy of external reflux
$h_i$=enthalpy of internal reflux
$H$=enthalpy of the vapor streams (assumed to be equal)

The enthalpy of the vapor streams entering and leaving the top tray can be expressed:

$$H = h_i + \lambda \qquad (3)$$

where $\lambda$ is the heat of vaporization of liquid on the tray.

The enthalpy of the external reflux can be expressed:

$$h_e = h_i - C_p \Delta T \qquad (4)$$

where $C_p$=specific heat of the external reflux stream
$\Delta T$=the difference in temperature between the top tray and external reflux Equation 3 can be substituted into Equation 2 to eliminate H and rewritten:

$$V_1(h_i + \lambda) - V_o(h_i + \lambda) = R_i h_i - R_e h_e \qquad (5)$$

Equation 4 can be substituted into Equation 5 to eliminate $h_e$ and rewritten:

$$(h_i + \lambda)(V_1 - V_o) = h_i(R_i - R_e) + R_e C_p \Delta T \qquad (6)$$

From Equation 1 it is known:

$$V_1 - V_o = R_i - R_e \qquad (7)$$

Equation 7 can be substituted into Equation 6 and reduced to obtain:

$$R_i = R_e \left(1 + \frac{C_p}{\lambda} \Delta T\right) \qquad (8)$$

Apparatus is provided in the control system of FIGURE 1 to establish a signal representative of the internal reflux $R_i$. A differential pressure transmitter 20 is connected across an orifice in conduit 16 to establish a signal which is representative of the differential pressure across the orifice. This signal is applied to the input of a means 21 for establishing an output signal representative of the square root of the input signal. The output signal of means 21, which is thus proportional to the flow $R_e$ through conduit 16, is applied to the first input of a multiplying means 22. A first thermocouple 23 is disposed in conduit 16 adjacent column 10, and a second thermocouple 24 is disposed in conduit 13 adjacent column 10. These two thermocouples are connected in opposition to the input of a transducer 25 which establishes an output signal representative of the difference between the two temperatures sensed by the thermocouples. If it is assumed that the temperature of the vapor above the top tray is equal to the temperature of the liquid on the top tray, the term $\Delta T$ is thus established by transducer 25. Transducer 25 is actually calibrated to provide an output signal proportional to the term $$\left(1 + \frac{C_p}{\lambda} \Delta T\right)$$

where $C_p/\lambda$ is assumed to be a constant for any given separation.

This signal is applied to the second input of multiplying means 22. The output signal from the multiplying means is thus representative of the term $R_i$ of Equation 8.

An equation representative of the internal feed in a fractionation column will now be derived.

The material balance at the feed tray of the fractionator can be expressed:

$$L_2 + F + V_3 = R_{if} + V_2 \qquad (9)$$

where $L_2$=internal reflux entering feed tray
$F$=feed entering feed tray
$V_3$=mass flow of vapor entering feed tray
$R_{if}$=total liquid leaving feed tray
$V_2$=mass flow of vapor leaving feed tray These flows are also illustrated in FIGURE 2. The term $R_{if}$ is the sum of F, $L_2$ and $F_2$, the latter being vapor which is condensed at the feed tray by subcooled feed.

The heat balance at the feed tray can be expressed:

$$h_{L_2} L_2 + h_F F + h_{V_3} V_3 = h_{R_{if}} R_{if} + h_{V_2} V_2 \qquad (10)$$

where $h_{L_2}$=enthalpy of liquid $L_2$
$h_F$=enthalpy of feed
$h_{V_3}$=enthalpy of vapor $V_3$
$h_{R_{if}}$=enthalpy of liquid $R_{if}$
$h_{V_2}$=enthalpy of vapor $V_2$ If it is assumed that the liquid $R_{if}$ leaving the feed tray and the vapor $V_2$ leaving the feed tray are at the same temperature, $$h_{V_2} = h_{R_{if}} + \lambda' \qquad (11)$$

where $\lambda'$ is the heat of vaporization of liquid on the feed tray.

Also, $$h_F = h_{R_{if}} - C_p'(T_T - T_F) \qquad (12)$$

where $C_p'$=specific heat of the feed
$T_T$=temperature of liquid on the feed tray
$T_F$=temperature of the feed It is also assumed that $h_{L_2} = h_{R_{if}}$ and $h_{V_3} = h_{V_2}$. These relationships and Equations 11 and 12 can be substituted into Equation 10 and rewritten:

$$h_{R_{if}} L_2 + F h_{R_{if}} - F C_p'(T_T - T_F) + (h_{R_{if}} + \lambda')(V_3 - V_2) = h_{R_{if}} R_{if} \qquad (13)$$

response that can be varied by adjusting resistors 72, 73 and 74.

Lag means 47 and 49 serve a different purpose than does lag means 42. Lag means 47 and 49 are utilized in computing the value of liquid flow $L_1$ into the kettle of fractionation column 10, see FIGURE 2. Under steady state operating conditions, the external reflux, feed and reboiler heat are supplied to the column at constant rates. If the external reflux should be increased suddenly, the computed value of the internal reflux will also increase. Since the kettle product withdrawal rate is determined by the level of liquid in the bottom of the column, a change in this withdrawal rate will lag the change in external reflux rate by an exponential function. This is due to the fact that a definite time is required for a change in reflux to appear in the kettle of the column. Lag 47 is employed to simulate the flow of internal reflux through the column so that the output signal of this lag means is representative of a change in the internal reflux as it subsequently appears in the kettle. If there are fifty trays in the column, for example, the ideal response of lag means 47 is characterized by a 50th order non-interacting lag. Although such a 50th order lag is impractical, a reasonably good approximation can be obtained by the use of a third order interacting lag of the type shown in FIGURES 3 and 4.

Lag means 49 is provided to approximate the response of the system due to a change in the computed internal feed. The sum of the outputs of lag means 47 and 49 is the quantity $L_1$ at any given time. This is the output signal of summing unit 48. The output signals of lag means 47 and 49 are added, and the measured value of the kettle product flow B, see FIGURE 2, is subtracted from the resulting sum by computer 50 to obtain a signal representative of the vapor $V_4$ flowing upwardly from the kettle, see FIGURE 2. By proper adjustment of lag means 47 and 49, an accurate value of $V_4$ is computed even though the internal reflux and internal feed may be changing. The lag means are necessary to compensate for changing conditions so that an accurate measurement is obtained at all times. Flow recorder-controller 54 adjusts the steam flow through conduit 12 in response to the computed value of $V_4$ to tend to keep the ratio of $V_4$ to $L_1$ constant whenever feed or reflux changes. The ratio of $V_4$ to $L_1$ which is desired to make a predetermined separation in column 10 is applied to the set point of ratio controller 53. The output of this ratio controller adjusts the set point of flow recorder-controller 54. Controller 53, in effect, multiplies $V_4/L_1$ by $L_1$ so that the output thereof resets the control point of controller 54 to change $V_4$ when $L_1$ changes and thus maintain the ratio of $V_4$ to $L_1$ equal to the set point value.

The control system of FIGURE 1 thus eliminates the effect of load disturbances on the column. Any changes in reflux temperature are corrected by the computation of internal reflux in the column. Changes in feed temperature are compensated by application of the internal feed computer. Changes in reboiler heat supply, which may occur due to a change in pressure in the steam header, for example, appear as changes in flow of the kettle product which influence the computed value of $V_4$. If the computed value of $V_4$ shows such a change, the heat supply to the column is adjusted to restore this vapor flow to the proper level.

A first embodiment of the computer of FIGURE 1 is illustrated in FIGURE 5. The control system of FIGURE 5 is similar in many respects to the control system of FIGURE 1 and corresponding elements are designated by like reference numerals. In the system of FIGURE 5, the internal reflux computer 80 represents elements 20, 21, 25 and 22 of FIGURE 1. The internal feed computer 81 represents elements 28, 29, 34 and 30 of FIGURE 1. The principal difference between the systems of FIGURES 1 and 5 is that computer 50 of FIGURE 1 is replaced by a subtractor unit 82 in FIGURE 5. This subtractor unit subtracts the kettle flow B from the sum of the lagged signals from the internal feed computer 81 and the internal reflux computer 80 to obtain $V_4$.

The control system shown in FIGURE 6 represents a third embodiment of the basic system of FIGURE 1. In the embodiment of FIGURE 6, the output signal of summing unit 48 represents the total liquid flow leaving the feed tray which is the sum of the internal reflux and the internal feed. This total flow is lagged by a means 84 to obtain a signal representative of the quantity $L_1$. The kettle flow B is subtracted from $L_1$ to provide a signal representative of the quantity $V_4$. Otherwise, the system of FIGURE 6 is substantially identical to the system of FIGURE 1.

A fourth embodiment of the control system of this invention is illustrated in FIGURE 7. The reflux and the feed are controlled in the same manner as in FIGURE 1, and corresponding elements are designated by like reference numerals. The output signal of internal feed computer 81 is applied through a lag means 90 to a ratio controller 91. The output signal of ratio controller 91 is applied to a flow recorder-controller 92 which also receives a signal B from a square root circuit of the type shown in FIGURE 1. The output signal of flow recorder-controller 92 adjusts valve 55 in steam conduit 12.

The control system of FIGURE 7 can be employed to advantage where the feed composition remains substantially constant over long periods of time. Under this condition, the operator knows the percentage of the feed that should be removed as a kettle product in order to make the desired separation. This fraction of the feed, designated B', is manually set on ratio controller 91 so that the computed value of $F_i$ is multiplied by $B_1$. If the actual measured value of B does not match the computed value of the product of $F_i$ times $B_1$, the steam flow is adjusted until the measured value of B is equal to such product. This control system inherently results in regulation of the ratios of $R_i$ to $F_i$ and $V_4$ to $L_1$.

Lag means 42 and 90 are adjusted to obtain the desired response of the overall system. If these lags were not present, a sudden change in the feed flow rate would immediately change $V_4$ so that the measured value of B would be changed. While all of the streams would eventually arrive at the proper levels, the response of the control system would be quite poor. The two lags are adjusted so that both the overhead and the kettle products will adjust to the proper levels without overshooting. Third order interacting lags of the type previously described can be employed to advantage in the system of FIGURE 7.

The control system of FIGURE 8 is generally similar to the system of FIGURE 7 except that controller 92 adjusts valve 58 in the kettle product conduit 18 instead of the control valve in the steam conduit. In the system of FIGURE 8, a differential pressure transmitter 96 in steam conduit 12 actuates a flow recorder-controller 97 to adjust valve 55. The set point of controller 97 is in turn adjusted by level controller 59 on the kettle of column 10.

In the event the composition of the feed stream should change appreciably, it is necessary to provide elements in the control system to compensate for these changes. The first embodiment of such a control system is illustrated in FIGURE 9. The system of FIGURE 9 is similar to those previously described in that the ratio of internal reflux to internal feed is controlled. The quantity $V_4$ is also computed as previously described. The output signal of computer 50, which is representative of $V_4$, is applied to flow recorder-controller 54 which adjusts valve 55 in steam conduit 12. However, the set point of flow recorder-controller 54 is adjusted by an analyzer recorder-controller 100 which responds to a measurement of a variable at some point within the column that is representative of the composition of the fluid mixture at that point in the column. The steam flow From Equation 9 it is known:

$$(V_3-V_2)=R_{if}-L_2-F \quad (14)$$

Equation 14 can be substituted into Equation 13 and reduced to obtain:

$$R_{if}=F\left[1+\frac{C_p'}{\lambda'}(T-F)\right]+L_2 \quad (15)$$

If the internal feed $F_i$ is defined as $(R_{if}-L_2)$ and $\Delta T'$ is defined as $(T_T-T_F)$, Equation 15 becomes:

$$F_i=F\left(1+\frac{C_p'}{\lambda'}\Delta T'\right) \quad (16)$$

A second differential pressure transducer 28 is connected across an orifice in feed conduit 11 to establish an output signal representative of the square of the flow through conduit 11. This signal is applied through a second square root means 29 to the first input of a second multiplying means 30. Thermocouples 31 and 32 are disposed in conduit 11 and in column 10 adjacent the feed tray, respectively. These two thermocouples are connected in opposition to the input of a transducer 34. Transducer 34 is calibrated to provide an output signal representative of the term $$\left(1+\frac{C_p'}{\lambda'}\Delta T'\right)$$

of Equation 16. The output signal of transducer 34 is applied to the second input of multiplier 30. The output signal of multiplier 30 is thus representative of the term $F_1$ of Equation 16.

The output signal from multiplier 30 is applied to a flow recorder-controller 38 which adjusts a control valve 39 in feed conduit 11. The output signal of multiplier 22 is applied to a flow recorder-controller 40 which adjusts a valve 41 in reflux conduit 16. The output signal of multiplier 30 is also applied through a lag means 42 to a ratio controller 43. The output signal of ratio controller 43 adjusts the set point of flow recorder-controller 40. The output signal of multiplier 22 is applied through a lag means 47 to the first input of a summing unit 48. The output of multiplier 30 is applied through a lag means 49 to the second input of summing unit 48. The output signal of summing unit 48 is applied to a ratio controller 53. The output signal of ratio controller 53 is applied to a flow recorder-controller 54 which adjusts a valve 53 in steam conduit 12.

A differential pressure transducer 51 establishes an output signal representative of the pressure differential across an orifice in conduit 18. This signal is applied to a flow recorder-controller 57 which adjusts a valve 58 in conduit 18. The set point of flow recorder-controller 57 is regulated by a level controller 59 which responds to the liquid level in the bottom of fractionator 10. The output signal of pressure transducer 51 is also applied through a square root means 52 to the first input of a computer 50. The outputs of lag means 47 and 49 are applied to the second and third inputs of computer 50, respectively. The output signal of computer 50, which represents the sum of the signals from lag means 47 and 49 minus the signal from square root means 52, is applied to adjust the set point of flow recorder-controller 54. A level controller 44 on accumulator 14 adjusts a valve 45 in the overhead product conduit 17 to maintain a predetermined liquid level in accumulator 14.

The control system of FIGURE 1 is provided for use on fractionation columns where the composition of the feed stream remains substantially constant. Disregarding lag means 42, ratio controller 43 adjusts the set point of flow recorder-controller 40 so as to maintain a predetermined ratio between the computed internal reflux and the computed internal feed. The desired ratio to be maintained is set manually by adjusting the set point of ratio controller 43. This ratio can be determined from experimental data or from calculations which show the desired ratio of internal reflux to internal feed to maintain a predetermined separation between the feed components. For example, it may be desirable to provide a ratio of 5 to 1 for a predetermined separation. If the calculated value of $F_i$ is 100 units per given time, the output signal from ratio controller 43 adjusts the set point of flow recorder-controller 40 to provide 500 units of internal reflux within column 10. Thus, ratio controller 43 multiples the output signal from multiplier 30 by a factor of 5, the set point of controller 43. An increase in flow of $F_i$ to 110 units, for example, will result in the internal reflux being increased to 550 units.

Lag means 42 is provided to delay the change in internal reflux in response to a change in the computed internal feed. In the example previously mentioned, it is assumed that the overhead product stream is flowing at a rate of 50 units when $F_i$ is 100 units. If $F_i$ should suddenly change to 110 and lag means 42 were not present, the reflux would immediately be changed to 550 units. Since the overhead product stream is controlled by the level in accumulator 14, this step change would reduce the flow of overhead product to approximately zero. It is obvious that this condition is not desirable. However, lag means 42 prevents such an abrupt change in the flow of external reflux. This lag means delays the increase in the external reflux until more heat is added to the reboiler to increase the overhead vapor flow from column 10, as described hereinafter. Also, the flow of internal reflux increases before there is an increase in vapor flow in the column, i.e., the liquid-to-vapor ratio increases. This causes overhead purity to get too high.

Lag means 42 can be a third order interacting pneumatic lag of the type shown in FIGURE 3, for example. However, other types of lags can also be employed, depending upon the required response. In some operations, a dead-time device plus a second or third order lag can be used to advantage. It is assumed that the input signal from multiplier 30 is a pneumatic pressure which is transmitted to conduit 60. The output pneumatic pressure from the lag means is transmitted through conduit 60' to ratio controller 43. Three adjustable valves 61, 62 and 63 are connected in series between conduits 60 and 60'. A first storage tank 64 communicates between valves 61 and 62; a second storage tank 65 communicates between valves 62 and 63; and a third storage tank 66 communicates with conduit 60'. The response of the lag means can be varied by adjusting the openings of the valves and/or the volumes of the storage tanks. In practice the lag means is adjusted until upsets in the column operation are eliminated when one of the variables suddenly changes. For example, the change of external reflux is delayed by lag means 42 until sufficient heat is supplied to the reboiler to increase the vapor flow from the column to provide the additional reflux desired. While the third order interacting pneumatic lag means shown in FIGURE 3 can be employed to advantage, it should be evident that a greater or lesser number of stages can be provided, depending upon the configuration of the delayed response that is required.

An electrical embodiment of a suitable lag means which can be employed as element 42 is illustrated in FIGURE 4. If the input signal is electrical, for example, such a signal is applied between input terminals 70a and 70b. The output signal is removed from terminals 71a and 71b. Variable resistors 72, 73 and 74 are connected in series relationship between terminals 70a and 71a. Terminals 70b and 71b are connected directly to one another. A first capacitor 75 is connected between terminal 70b and the junction between resistors 72 and 73; a second capacitor 76 is connected between terminal 70b and the junction between resistors 73 and 74; and a third capacitor 77 is connected between output terminals 71a and 71b. The electrical circuit of FIGURE 4 thus provides an RC filter network which has an exponential is adjusted to keep the measured composition uniform. Analyzer 100 can respond to a temperature sensing device 101 which is positioned within the column intermediate the ends thereof. Alternatively, this analyzer can be an instrument which actually measures the concentration of a component of the fluid mixture within the column and which provides a signal representative thereof. Chromatographic, infrared and ultraviolet analyzers and mass spectrometers are examples of such analytical instruments. The control system of FIGURE 9 is similar to control systems previously known in the art with respect to the analysis of the fluid mixture within the column, but differs from previous systems in that load disturbances due to changes in reflux temperature, feed temperature, heat supply and feed flow changes have been eliminated. While the control provided by the system of FIGURE 9 is not exact because both the reflux and heat must be adjusted as a function of feed composition if the operation is to be maintained exactly uniform, the system of FIGURE 9 does provide improved results over systems previously known and is of considerable value.

Figure 10:
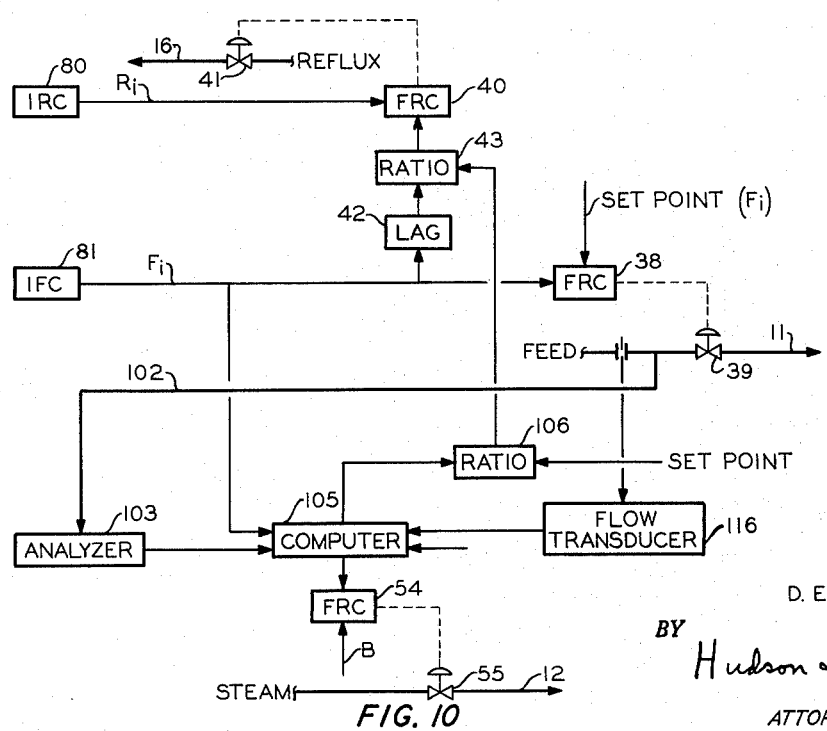
FIGURE 10 is a schematic representation of a seventh embodiment of the control system of this invention.

A second embodiment of a control system which is capable of compensating for changes in feed composition is illustrated in FIGURE 10. In this system, a sample of the feed stream is withdrawn through a conduit 102 and directed to the inlet of an analyzer 103. Analyzer 103 is a composition analyzer such as a chromatograph which is capable of measuring the fraction of the feed which is a heavy key component in the system. By specifying the fractions of the heavy key component desired in the overhead and in the kettle, the proper value of the kettle flow B can be computed. Such a computation is made by the computer 105 which receives output signals from analyzer 103 and from internal feed computer 81. Computer 105 is also provided with certain preselected terminal specifications representative of the heavy key component in the product streams. The output signal of computer 105 is transmitted to flow recorder-controller 54 which regulates valve 55 in conduit 12. Flow recorder-controller 54 also receives a signal representative of the actual kettle flow B, as previously described. An output signal of computer 105 is also transmitted through a ratio controller 106 to the set point of ratio controller 43. Ratio controller 43, in turn, adjusts the set point of flow recorder-controller 40 which regulates valve 41 in reflux conduit 16.

There are essentially nine ways to specify a fractionation operation. These nine ways cover the majority of operations normally encountered. The nine general specifications are:

1. (a) Desired recovery of light key ($R_L$).
   (b) Desired fraction of heavy key in distillate ($H_D$).
2. (a) Desired fraction of heavy key in distillate ($H_D$).
   (b) Desired fraction of light key in bottom ($L_B$).
3. (a) Desired fraction of light key in distillate divided by light key in distillate+heavy key in distillate $$\left(\frac{L_D}{L_D+H_D}\right)$$

(b) Desired recovery of light key ($R_L$).
4. (a) Desired recovery of heavy key ($R_H$).
   (b) Desired fraction of light key in bottom ($L_B$).
5. (a) Desired fraction of light key in distillate divided by light key in distillate+heavy key in distillate $$\left(\frac{L_D}{L_D+H_D}\right)$$

(b) Desired fraction of light key in bottom ($L_B$).
6. (a) Desired fraction of heavy key in bottom divided by heavy key in bottom+light key in bottom $$\left(\frac{H_B}{H_B+L_B}\right)$$

(b) Desired fraction of heavy key in distillate ($H_D$).
7. (a) Desired fraction of heavy key in bottom divided by heavy key+light key $$\left(\frac{H_B}{H_B+L_B}\right)$$

(b) Desired recovery of heavy key ($R_H$).
8. (a) Desired fraction of light key in distillate divided by light key in distillate+heavy key in distillate $$\left(\frac{L_D}{L_D+H_D}\right)$$

(b) Desired fraction of heavy key in distillate ($H_D$).
9. (a) Desired fraction of heavy key in bottom divided by heavy key in bottom+light key in bottom $$\left(\frac{H_B}{H_B+L_B}\right)$$

(b) Desired fraction of light key in bottom ($L_B$).

If the feed composition, feed flow and the specified operation are known, the bottom flow can be computed. The following are equations which solve for the bottom flow for each of the nine specifications:

Specify

1. $\left.\begin{array}{l}R_L\\H_D\end{array}\right\}$ $\quad B=F\left[\dfrac{(1-H_D)-L_{LF}-R_LL_F}{(1-H_D)}\right]$ (17)

2. $\left.\begin{array}{l}H_D\\L_B\end{array}\right\}$ $\quad B=F\left[\dfrac{(1-H_D)-L_{LF}-L_F}{(1-H_D)-L_B}\right]$ (18)

3. $\left.\begin{array}{l}S=\dfrac{L_D}{L_D+H_D}\\R_L\end{array}\right\}$ $\quad B=F\left[\dfrac{S-SL_{LF}-R_LL_F}{S}\right]$ (19)

4. $\left.\begin{array}{l}R_H\\L_B\end{array}\right\}$ $\quad B=F\left[\dfrac{F_{HF}+R_HH_F}{(1-L_B)}\right]$ (20)

5. $\left.\begin{array}{l}S=\dfrac{L_D}{L_D+H_D}\\L_B\end{array}\right\}$ $\quad B=F\left[\dfrac{S-SL_{LF}-L_F}{(S-L_B)}\right]$ (21)

6. $\left.\begin{array}{l}X=\dfrac{H_D}{H_B+L_B}\\H_D\end{array}\right\}$ $\quad B=F\left[\dfrac{XH_{HF}+H_F-H_D}{XH_D}\right]$ (22)

7. $\left.\begin{array}{l}X=\dfrac{H_B}{H_B+L_B}\\R_H\end{array}\right\}$ $\quad B=F\left[\dfrac{XH_{HF}+R_HH_F}{X}\right]$ (23)

8. $\left.\begin{array}{l}S=\dfrac{L_D}{L_D+H_D}\\H_D\end{array}\right\}$ $\quad B=F\left[\dfrac{(1-S-H_D)-(1-S)L_{LF}}{(1-S-H_D)}\right]$ (24)

9. $\left.\begin{array}{l}X=\dfrac{H_B}{H_B+L_B}\\L_B\end{array}\right\}$ $\quad B=F\left[\dfrac{(1-X)H_{HF}}{(1-X-L_B)}\right]$ (25)

The components $H_{HF}$ and $L_{LF}$ may actually be several individual components combined. For example, a feed mixture can be separated as follows:

| Feed | Overhead | Kettle |
|---|---|---|
| Ethane | Ethane | |
| Propane | Propane | |
| Isobutane | Isobutane | |
| Normal butane | Normal butane | Normal butane. |
| Isopentane | Isopentane | Isopentane. |
| Normal pentane | | Normal pentane. |
| Hexanes and heavier | | Hexanes and heavier. |

In this separation, the quantities of Equations 17 to 25 can be as follows:

$L_{LF}$=Ethane+propane+isobutane
$L_F$=Normal butane
$H_F$=Isopentane $H_{HF}$ = Normal pentane + hexanes and heavier
$L_{LD}$ = Ethane + propane + isobutane
$L_D$ = Normal butane
$H_D$ = Isopentane
$L_B$ = Normal butane
$H_B$ = Isopentane
$H_{HB}$ = Normal pentane + hexanes and heavier It will be observed that all of the Equations 17 to 25 are of the same general form:

$$B = F\left[\frac{A + BY + CZ}{D}\right] \quad (26)$$

One basic computer can be employed to solve any of these seven equations to provide the desired degree of separation. Such a computer is illustrated schematically in FIGURE 11. The output of a first set point transducer 110 is applied to the first input of a summing unit 111. The output of a second set point transducer 112 is applied to the input of a multiplying and dividing unit 113. The output signals from transducers 110 and 112 are A and D, respectively. Signals Y and Z from the analyzer are applied to respective first inputs of multipliers 114 and 115. Constants B and C are applied to the respective second inputs of multipliers 114 and 115. The outputs of the two multipliers are applied to respective inputs of summing network 111. The output signal of a flow transducer 116 is applied to the second input of multiplying and dividing unit 113. From an inspection of FIGURE 11 it can be seen that the output signal is representative of Equation 26 described above.

Figure 11:
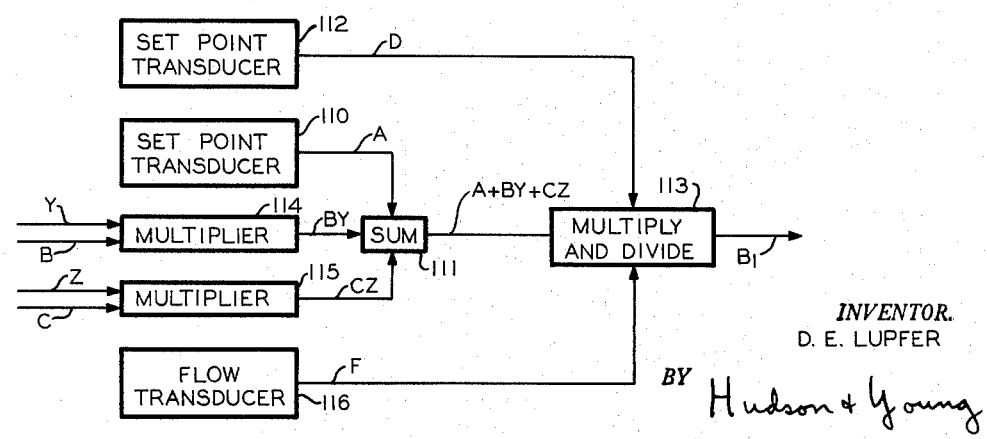
FIGURE 11 is a schematic representation of a computer which can be employed in the control system of FIGURE 10.
Figure 18:
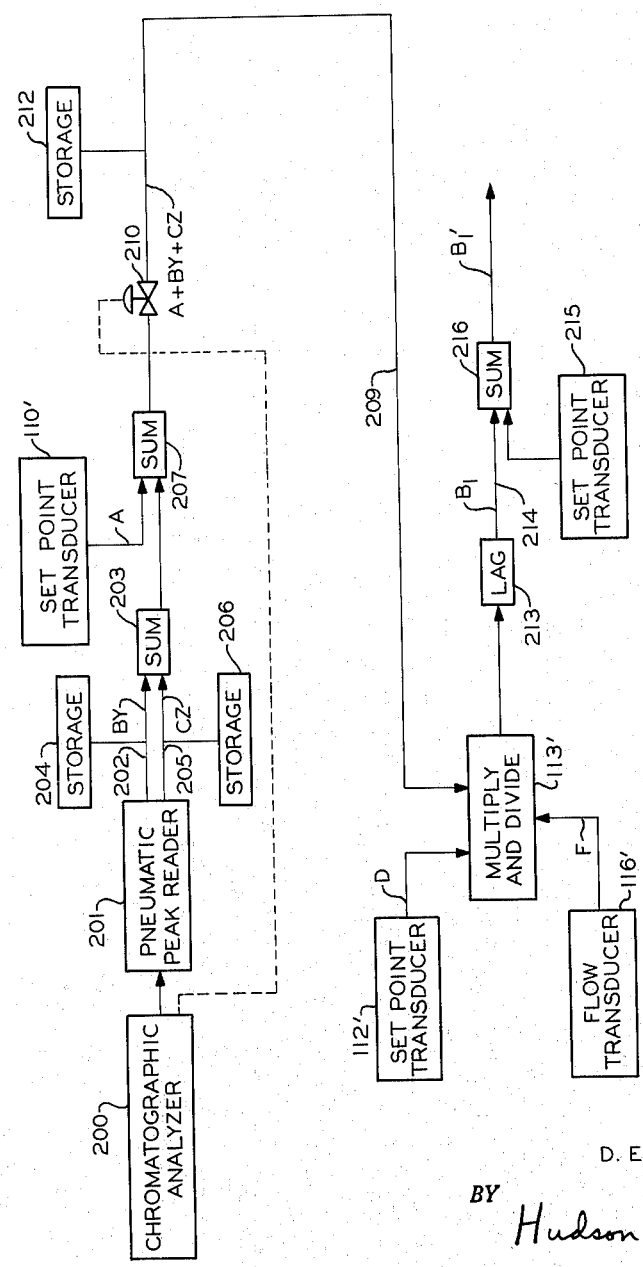
FIGURE 18 illustrates a second embodiment of the computer of FIGURE 11.

A second embodiment of the computer of FIGURE 11 is illustrated in FIGURE 18. Several of the elements of FIGURE 18 are identical to those of FIGURE 11 and are designated by like primed reference numerals. A chromatographic analyzer 200 is employed to provide output signals representative of individual components or sums of components of the feed mixture. The output signals of the chromatographic analyzer are transmitted in sequence to a pneumatic peak reader 201 which provides pneumatic signals representative of these components. The output signals of the analyzer and the peak reader can be attenuated by selected factors to perform the desired multiplication. A signal representative of the quantity BY is thus transmitted by conduit 202 to the first input of a summing means 203. An air storage means 204 is connected to conduit 204 so as to store a pneumatic pressure representative of this signal. In a similar manner, a signal representative of the quantity CZ is transmitted by a conduit 205 to the second input of summing means 203. A storage means 206 is connected to conduit 205. The output of summing means 203 is connected to the first input of a second summing means 207. A signal representing the quantity A is transmitted to the second input of summing means 207 from set point transducer 110'. It should be obvious that summing means 203 and 207 could be combined in a singe unit, if desired. The output signal from summing means 207 is transmitted by a conduit 209, which has a control valve 210 therein, to the first input of multiply and divide means 113'. A control signal from analyzer 200 opens valve 210 momentarily after the complete analysis cycle to transmit a signal representative of the quantity (A+BY+C) to means 113'. A storage means 212 is connected to conduit 209 to store this pneumatic signal until the next analysis cycle by the chromatographic analyzer is completed.

Signals representative of the quantities D and F are applied to means 113' from respective transducers 112' and 116'. The output of means 113' is transmitted through a lag means 213 to an output conduit 214. The pneumatic pressure in conduit 214 is thus representative of the quantity $B_1$. In some operations, it is necessary to supply a bias signal to this output pressure. This can be accomplished by means of a set point transducer 215 which transmits a bias signal to a summing means 216 where such signal is combined with signal $B_1$ to provide a final output signal $B_1'$.

In FIGURE 10, the computed value of B from computer 105 adjusts the set point of controller 54. If the computed value of B differs from the measured value, the heat supplied to column 10 is adjusted to equalize the two values. The output from computer 105 which is applied to ratio computer 106 is actually $H_F$, the analyzed heavy key concentration in the feed. The set point signal transmitted to ratio computer 106 is $R_i/F_i$ divided by $H_F$. Thus, the set point signal applied to ratio controller 43 is $R_i/F_i$. This ratio is maintained by adjusting the external reflux flow through conduit 16.

Figure 12:
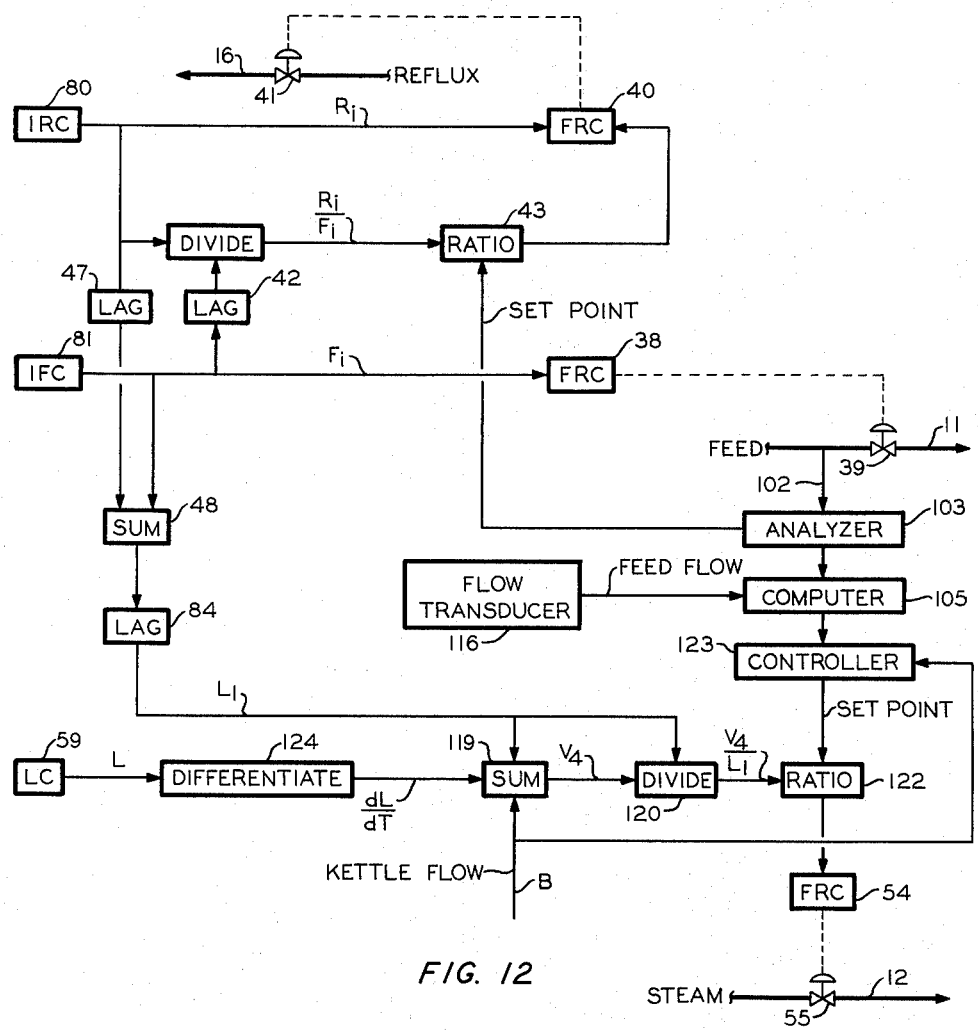
FIGURE 12 is a schematic representation of an eighth embodiment of the control system of this invention.

The control system of FIGURE 12 also computes the kettle flow in response to an analysis of the feed mixture. The output signal of analyzer 103 adjusts the set point of ratio controller 43 to vary the ratio of internal reflux to internal feed as required to compensate for changes in composition of the feed mixture. A subtracting means 119 subtracts the kettle flow B from the liquid flow $L_1$ in the lower region of the column to compute the vapor $V_4$ which flows upwardly from the kettle. The signal $V_4$ is divided by the signal $L_1$ in a dividing means 120, and the quotient is applied to a ratio controller 122 which adjusts the set point of controller 54. The measured kettle flow B is applied to a controller 123 which compares the measured kettle flow B with the corresponding value computed by computer 105. Any difference between the two values establishes an error signal which adjusts the set point of ratio controller 122.

The level signal L from controller 59 is differentiated by a unit 124 to establish a signal $dL/dT$, T being time. This derivative is added to $L_1$ in summing unit 119 to compensate for rates of change of liquid level in the kettle of column 10. The quantity $dL/dT$ is, of course, zero under steady state conditions. If desired, this differentiating means can be added to any of the systems previously described which employ level control signals.

Figure 13:
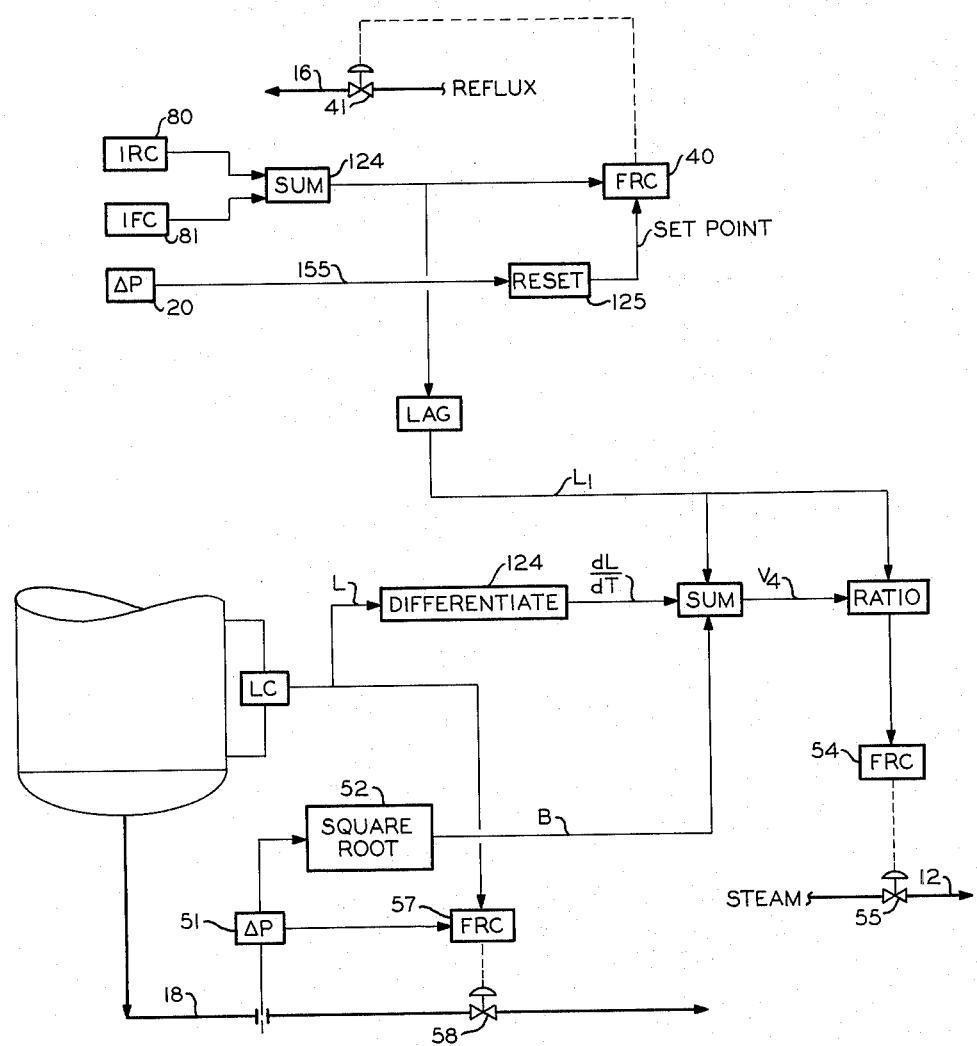
FIGURE 13 is a schematic representation of a ninth embodiment of the control system of this invention.

In FIGURE 13 there is shown a computer system is useful under conditions where the available external reflux is not always sufficient to maintain a preselected internal reflux. It is assumed that the feed enters the column near the top. The total liquid flow downwardly from the upper region of the column is thus equal to the sum of the internal reflux and the internal feed. This quantity is computed by applying the output signals of computers 80 and 81 to a summing means 124. The output signal from summing means 124 is applied to flow controller 40 which adjusts valve 41 in reflux conduit 16. An output signal from differential pressure transducer 20 is applied to a reset mechanism 125. The output signal from reset mechanism 125 resets the set point of flow controller 40 in the manner described hereinafter.

Figure 14:
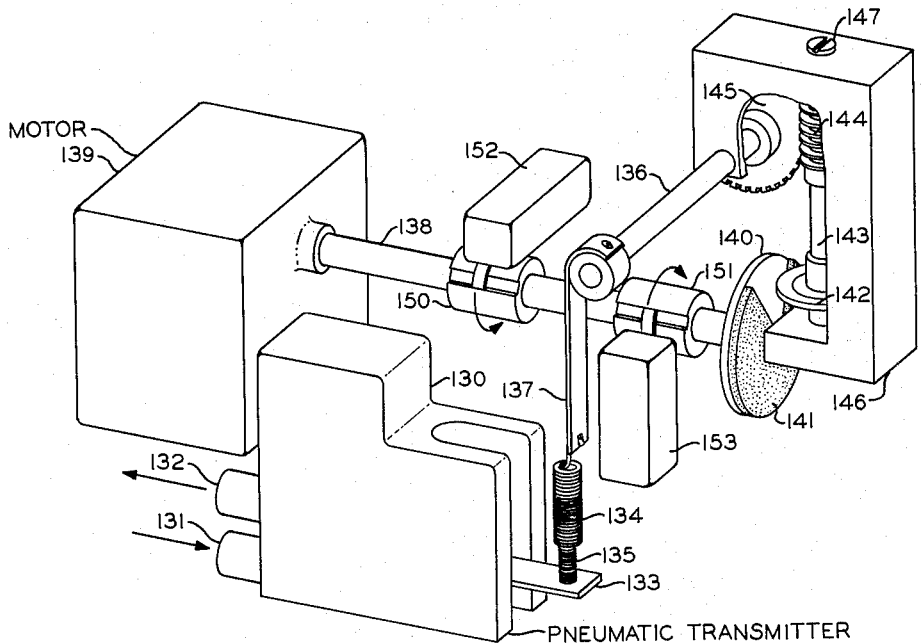
FIGURE 14 is a schematic representation of the reset mechanism of the control system of FIGURE 13.

A first embodiment of reset mechanism 125 is illustrated schematically in FIGURE 14. This reset mechanism employs a conventional pneumatic transmitter 130. A pneumatic pressure of constant value is applied to the inlet port 131 of transmitter 130. An output pneumatic pressure is transmitted from a port 132 which is a function of the input pressure. The relationship between the output pressure and the input pressure is controlled by the position of plate 133. This plate can adjust the position of a flapper adjacent a nozzle within the transmitter, as is well known by those familiar with the pneumatic control art, to control the output pressure at port 132.

Plate 133 normally is retained in a downwardly position by means of a biasing spring, not shown, within transmitter 130. The first end of a spring 134 is attached to a screw 135 which is threaded to the end of plate 133. The second end of spring 134 is secured to a belt 137 which is attached at its upper end to a rotatable shaft 136. Rotation of shaft 136 in a clockwise direction thus increases the tension on spring 134 to lift the end of plate 133. Counterclockwise rotation of shaft 136 permits plate 133 to be lowered by the spring within transmitter 130.

Shaft 136 is connected to the drive shaft 138 of a reversible motor 139. A first solid disk 140 is mounted on the end of drive shaft 138. A second disk 141 having a cutout sector is secured to disk 140. A wheel 142 is mounted on a shaft 143 so as to be rotated when engaged by disk 141. Wheel 142 remains stationary when the open sector of disk 141 is adjacent the wheel. Shaft 143 carries a worm 144 which meshes with a gear 145 on shaft 136. Shaft 143 is mounted within a frame 146 in such a manner as to rotate freely. Wheel 142 is affixed to shaft 143 by means of a set screw, not shown. This is to provide a means for adjusting the vertical position of wheel 142 with respect to disk 141 so as to vary the degree of rotation of shaft 143 for each rotation of motor shaft 138. The screw driver slot 147 provides a means of adjusting the tension of spring 54 initially to preset the output of transmitter 130.

First and second clutches 150 and 151 are mounted on drive shaft 138 to actuate respective electrical switches 152 and 153. Clutch 150 is arranged so that the outer race thereof rotates in a counterclockwise direction when drive shaft 138 rotates in a counterclockwise direction. However, the outer race of clutch 150 remains stationary when drive shaft 138 rotates in a clockwise direction. Clutch 151 is of like construction except that the outer race rotates only when drive shaft 138 rotates in a counterclockwise direction. These clutches can be one-way roller clutches of the type described in Catalog B–54 of Miniclutch Company, Hamden, Conn., for example.

With reference to FIGURE 13, reset mechanism 125 is actuated by the output signal from differential pressure transducer 20. This pressure transducer establishes an output pneumatic pressure which is a direct function of the flow through conduit 16. The pressure from transducer 20 is applied by means of a conduit 155 to the interior of bellows 156 and 157 (see FIGURE 15). The upper ends of bellows 156 and 157 engage respective fixed supports, whereas the lower movable ends of the bellows engage respective spring retainers 158 and 159. A spring 160 extends between retainer 158 and a second retainer 161 which is adjustably secured to a fixed support plate 162. In a similar manner, a spring 163 extends between retainer 159 and a second retainer 164 which is adjustably secured to a fixed support plate 165. Electrical contacts 166 and 167 are secured to respective retainers 158 and 159 to move therewith. Contact 166 engages a stationary contact 168 when bellows 156 is collapsed by a predetermined amount, and contact 167 engages a stationary contact 169 when bellows 157 is expanded by a predetermined amount. The contacts associated with bellows 156 are thus closed when the input pressure falls below a first preselected limit. The contacts associated with bellows 157 are closed when the input pressure exceeds a second predetermined limit.

Motor 139 can advantageously be a reversible, two-phase induction motor having first and second windings 172 and 173. First terminals of windings 172 and 173 are connected to the first terminal of alternating current source 174. The second terminal of current source 174 is connected to contacts 168 and 169. Contact 166 is connected directly to the second terminal of motor winding 173, and contact 167 is connected directly to the second terminal of motor winding 172. A capacitor 175 is connected between the second terminals of motor windings 172 and 173. Terminals 168 and 169 are connected to respective switch arms 176 and 177 which are actuated by respective clutches 151 and 150. Switch arms 176 and 177 are adapted to engage respective contacts 178 and 179 which are connected to respective contacts 166 and 167.

Figure 15:
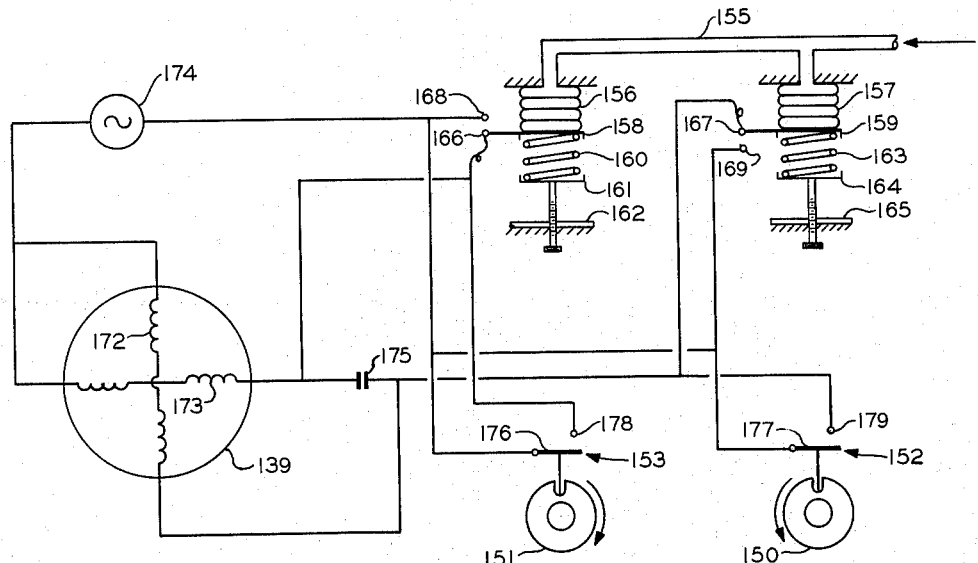
FIGURE 15 is a schematic circuit drawing of features of the reset mechanism of FIGURE 14.

As long as the input pressure transmitted by conduit 155 remains within preselected limits, the apparatus of FIGURES 14 and 15 remains in the position shown with motor 139 being deenergized. If the input pressure exceeds the upper set point due to excessive flow of external reflux through conduit 16, bellows 157 expands until contacts 167 and 169 engage one another. This energizes motor 139 for rotation in a first direction. Clutch 150 is actuated so as to move switch arm 177 into engagement with contact 179 immediately after the motor rotation is started. This assures that the motor will remain energized for one cycle of rotation of shaft 138, even though the pressure within bellows 157 may decrease during this cycle. Motor 139 is geared to shaft 138 so as to rotate the shaft in a period of time such as one minute, for example. However, this time obviously can be varied. During the cycle of rotation, shafts 136 and 143 are rotated when disk 141 engages wheel 142 so as to change the tension spring 134 and thus adjust the output pressure of the pneumatic transmitter 130. This change in output pressure from transmitter 130 adjusts the set point of controller 40 in FIGURE 12 to vary the flow through conduit 16. This change takes place in a very short time to reduce the output signal of differential pressure transmitter 20. Accordingly, the pressure in conduit 155 normally will decrease sufficiently by the end of one cycle of motor rotation to move contacts 167 and 168 out of engagement with one another. Rotation of motor 139 is thus terminated when clutch 150 is returned to the position shown in FIGURE 14.

A decrease in pressure in conduit 155 below the lower set point permits bellows 156 to contract until contacts 168 and 169 are in engagement. This energizes motor 139 for rotation in the opposite direction because capacitor 175 is connected in series with winding 172 to change the relative phases of the currents through the two motor windings. Clutch 151 is energized to assure one cycle of motor operation in a manner similar to that previously described with respect to clutch 150. Under normal operation, rotation of motor 139 is again terminated after one cycle.

With reference to FIGURE 13, it can be seen that the output signal of reset mechanism 125 thus changes the set point of flow controller 40 stepwise until an internal reflux value is established which can be maintained within the column. In the event this resetting is not sufficient in one cycle to establish a stable value, the operation continues as many times as are required to obtain a stable value of liquid flow in the column. The amount the set point is varied during each cycle of operation is determined by the adjustable variables of the mechanism of FIGURE 14. For example, the force exerted by spring 134 can be adjusted by regulating the position of screw 135 in plate 133. Similarly, the degree of rotation of shaft 136 is a function of the position of wheel 142 with respect to the opening in disk 141.

Figure 16A:
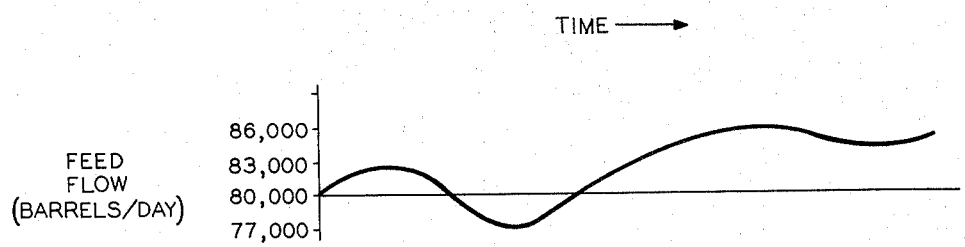
FIGURES 16a to 16d show operating features of the control system of FIGURE 13.
Figure 16B:
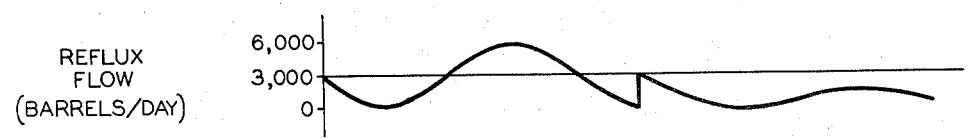
Figure 16C:
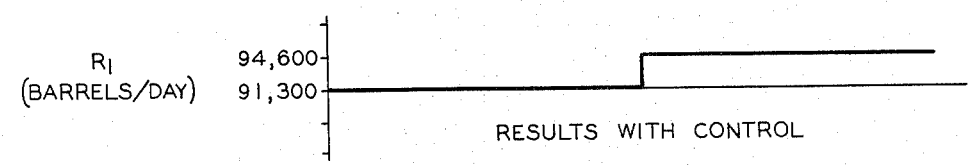
Figure 16D:
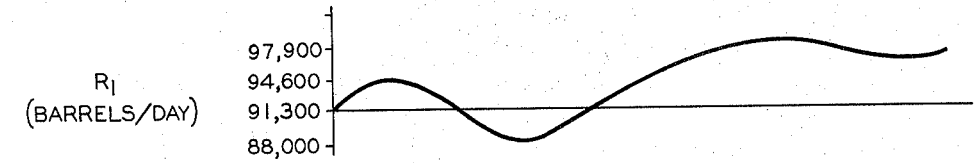

The operation of the control system of FIGURE 13 is illustrated in FIGURES 16a to 16d and 17a to 17d. FIGURES 16a and 16b show variations in feed flow and reflux flow, respectively, as a function of time. FIGURE 16c shows variations of the internal reflux flow as a function of time when the control system of FIGURE 13 is employed, and FIGURE 16d shows variations of the internal reflux as a function of time in the absence of the control system of FIGURE 13. It is first assumed that both the feed and reflux temperatures are constant. If the feed flow varies between 77,000 and 83,000 barrels per day as shown in FIGURE 16a, the external reflux flow can be manipulated between 0 and 6,000 barrels per day, see FIGURE 16b, to hold the value of internal reflux constant at 91,300 barrels per day, see FIGURE 16c. If, however, the feed rate increases above 83,000 barrels per day, no further compensation could be made by manipulating the external reflux so that the internal reflux would vary as shown in the right-hand side of FIGURE 16d. The reset mechanism 125 of FIGURE 13 is, therefore, employed to shift the internal reflux set point when the reflux reaches either its upper or lower limit. When the feed increases above 83,000 barrels per day, the internal reflux set point is automatically shifted to 94,600 barrels per day as shown in the center of FIGURE 16c to force the reflux back to the middle of its range as shown in FIGURE 16b. This obviously results in much smoother column operation.

Figure 17A:
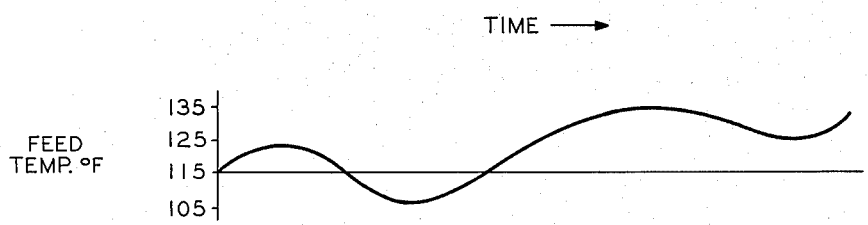
FIGURES 17a to 17d show additional operating features of the control system of FIGURE 13.
Figure 17B:
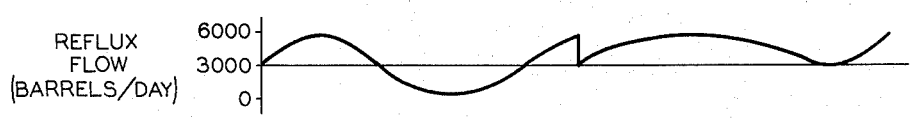
Figure 17C:
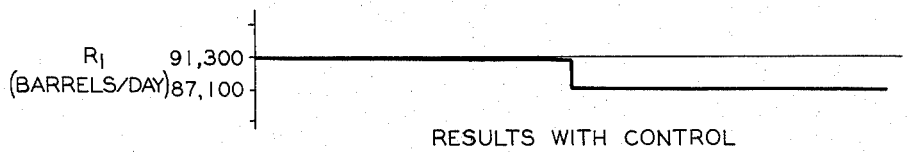
Figure 17D:
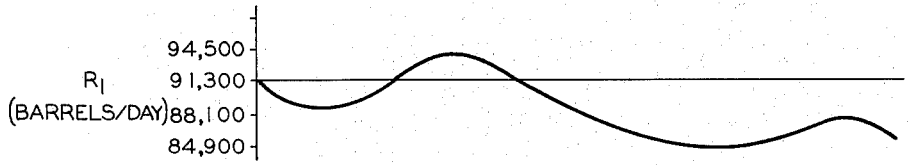

FIGURES 17a to 17d show the reflux compensation required to maintain the internal reflux constant for temperature changes when the feed flow volume is constant. If the feed temperature should increase above 125° F., for example, the internal reflux set point is shifted by the reset mechanism to return the reflux to the middle of its scale as shown in FIGURE 17b. As shown in FIGURES 17c and 17d, the resulting flow of internal reflux is much more uniform with this reset mechanism than without such mechanism.

The various flow controllers, summing means, ratio controllers, multiplying means, square root means, and dividing means employed in this invention can be conventional apparatus known to those skilled in the control art. Either pneumatic or electrical components can be employed, for example.

While this invention has been described in conjunction with present preferred embodiments, it should be evident that it is not limited thereto.

What is claimed is:

1. In a system to separate fluid mixtures, which system includes a fractionation column, first conduit means communicating with said column to introduce a fluid mixture to be separated, means to maintain a temperature differential between the lower and upper regions of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, seventh means responsive to said first and second signals to establish a third signal which is representative of the rate of flow of liquid downwardly through the lower region of said column, eighth means to sense the rate of flow through said second conduit means and to establish a fourth signal which is representative of such rate of flow, and ninth means responsive to said third and fourth signals to regulate the temperature differential between the lower and upper regions of said column so as to tend to maintain the ratio of said third signal to said fourth signal constant at a preselected value.

2. The system of claim 1, further comprising means responsive to said first and second signals to control the rate of flow of said external reflux so as to tend to maintain the ratio of said first signal to said second signal constant at a preselected value.

3. In a system to separate fluid mixtures, which system includes a fractionation column, first conduit means communicating with said column to introduce a fluid mixture to be separated, means to maintain a temperature differential between the lower and upper regions of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, seventh means responsive to said first and second signals to control the rate of flow of said external reflux so as to tend to maintain the ratio of said first signal to said second signal constant at a preselected value, eighth means to sum said first and second signals so as to establish a third signal which is representative of the rate of flow of liquid downwardly through the lower region of said column, means to sense the rate of flow through said second conduit means and to establish a fourth signal which is representative of such rate of flow, means responsive to said first, second and fourth signals to establish a fifth signal which is representative of the sum of said first and second signals minus said fourth signal, and means responsive to said fifth and said third signals to control said means to maintain a temperature differential so as to tend to maintain the ratio of said third signal to said fifth signal constant at a preselected value.

4. The system of claim 3 wherein said means to sum includes means to delay said first and second signals by preselected amounts prior to being summed.

5. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, means to sum said first and second signals so as to establish a third signal which is representative of the rate of flow of liquid downwardly through the lower region of said column, means to sense the rate of flow through said second conduit means and to establish a fourth signal which is representative of such rate of flow, means responsive to said first, second and fourth signals to establish a fifth signal which is representative of the sum of said first and second signals minus said fourth signal, means responsive to said fifth signal to control said means to supply heat to tend to maintain said fifth signal constant at a preselected value, and means responsive to said third signal to control further said means to supply heat to tend to maintain said third signal constant at a preselected value.

6. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establih a second signal which is representative of the rate of flow of internal feed in said column, means responsive to said first and second signals to control the rate of flow of said external reflux so as to tend to maintain the ratio of said first signal to said second signal constant at a preselected value, first and second signal delay means, signal summing means, flow control means connected to said means to supply heat, said flow control means having an adjustable set point, means to sense the rate of flow through said second conduit means and to establish a third signal which is representative of such rate of flow, computing means, means to transmit said first and second signals through said first and second delay means, respectively, to said computing means, means to transmit said third signal to said computing means, means to apply the output of said computing means, which is representative of the sum of said first and second signals minus said third signal, to said flow control means to actuate same, signal multiplying means, means to transmit output signals from said delay means to said summing means, means to apply the output from said summing means to one input of said multiplying means, means to apply a constant signal to the second input of said multiplying means, and means responsive to the output of said multiplying means to adjust the set point of said flow control means.

7. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, first and second signal delay means, signal summing means, flow control means connected to said means to supply heat, said flow control means having an adjustable set point, means to sense the rate of flow through said second conduit means and to establish a third signal which is representative of such rate of flow, means to transmit said first and second signals through said first and second delay means, respectively, to the inputs of said summing means, signal subtracting means, means to apply the output of said summing means and said third signal to said subtracting means, means to apply the output of said subtracting means, which is representative of the output of said summing means minus said third signal, to said flow control means to actuate same, signal multiplying means, means to apply the output from said summing means to one input of said multiplying means, means to apply a constant signal to the second input of said multipling means, and means responsive to the output of said multiplying means to adjust the set point of said flow control means.

8. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, first and second signal delay means, signal summing means, flow control means connected to said means to supply heat, said flow control means having an adjustable set point, means to sense the rate of flow through said second conduit means and to establish a third signal which is representative of such rate of flow, means to transmit said first signal through said first delay means to said summing means, means to apply said second signal to said summing means, signal subtracting means, means to transmit the output of said summing means through said second delay means to said substracting means, means to apply said third signal to said substracting means so as to be subtracted from the signal transmitted through said second delay means, means to apply the output signal from said substracting means to said flow control means to actuate same, signal multiplying means, means to apply the output signal from said second delay means to one input of said multiplying means, means to apply a constant signal to the second input of said multiplying means, and means responsive to the output of said multiplying means to adjust the set point of said flow control means.

9. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, signal delay means, signal multiplying means, flow control means connected to said means to supply heat, said flow control means having an adjustable set point, means to sense the rate of flow through said second conduit means and to establish a third signal which is representative of such rate of flow, means to apply said third signal to said flow control means to actuate same, means to transmit said second signal through said delay means to one input of said multiplying means, means to apply a constant signal to the second input of said multiplying means, and means responsive to the output of said multiplying means to adjust the set point of said flow control means.

10. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is respresentative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, signal delay means, signal multiplying means, flow control means connected to said second conduit means, said flow control means having an adjustable set point, means to transmit said second signal through said delay means to one input of said signal multiplying means, means to apply a constant signal to the second input of said multiplying means, and means responsive to the output of said multiplying means to adjust the set point of said flow control means.

11. The control system of claim 10 further comprising means to measure the liquid level in the lower region of said column, and means responsive to said means to measure liquid level to control said means to supply heat so as to tend to maintain said liquid level constant.

12. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, means to sum said first and second signals so as to establish a third signal which is representative of the rate of flow of liquid downwardly in the lower region of said column, means to sense the rate of flow through said second conduit means and to establish a fourth signal which is representative of such rate of flow, means responsive to said first, second and fourth signals to establish a fifth signal which is representative of the sum of said first and second signals minus said fourth signal, flow control means connected to said means to supply heat, said control means having an adjustable set point, means responsive to said fifth signal to actuate said flow control means, means communicating with said column to establish a sixth signal which is representative of the composition of the fluid mixture being separated at a preselected region in said column, and means responsive to said sixth signal to adjust the set point of said flow control means so as to tend to maintain said sixth signal constant.

13. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means responsive to said first and second signals to control the rate of flow of said external reflux so as to tend to maintain the ratio of said first signal to said second signal constant at a preselected value, flow control means connected to said means to supply heat, said flow control means having an adjustable set point, means to sense the rate of flow through said second conduit means and to establish a third signal which is representative of such rate of flow, means responsive to said third signal to actuate said control means, means to sense the rate of flow through said first conduit means and to establish a fourth signal which is representative of such rate of flow, analyzer means communicating with said first conduit means, means responsive to said analyzer means to provide two output signals which are representative of concentrations in the feed of materials to be withdrawn through said second and third conduit means, respectively, computer means to provide an output signal representative of the quantity $$F\left[\frac{A+BY+CZ}{D}\right]$$

means to apply said first signal to said computer as F, means to apply said two output signals to said computer as Y and Z, respectively, means to apply individual constant signals to said computer as A, B, C and D, respectively, and means responsive to the output of said computer means to adjust the set point of said flow control means.

14. In a system to separate fluid mixtures, which system includes a fractionation column, first conduit means communicating with said column to introduce a fluid mixture to be separated, means to supply heat to the lower region of said column, second conduit means communicating with a lower region of said column to withdraw a first stream, third conduit means communicating with the upper region of said column to withdraw a second stream, and fourth conduit means to return a portion of the second stream to said column as external reflux; means to sense the rate of flow through said first conduit means and to establish a first signal which is representative of such rate of flow, analyzer means communicating with said first conduit means, means responsive to said analyzer means to provide two output signals which are representative of concentrations in the feed of materials to be withdrawn through said second and third conduit means, respectively, computer means to provide an output signal representative of the quantity $$F\left[\frac{A+BY+CZ}{D}\right]$$

means to apply said first signal to said computer as F, means to apply said two output signals to said computer as Y and Z, respectively, means to apply individual constant signals to said computer as A, B, C and D, respectively, and means responsive to the output of said computer means to control the rate at which heat is supplied to said column.

15. The control system of claim 14 wherein said computer means comprises signal summing means, first, second and third signal multiplying means, signal dividing means, means to connect the outputs of said first and second multiplying means to said summing means, means to apply a constant signal to said signal summing means, means to apply the output of said summing means to said third multiplying means, means to apply a constant signal to said third multiplying means, and means to divide the output of said third multiplying means by said second signal.

16. The control system of claim 14 wherein said computer means comprises first, second and third signal summing means, means to apply first and second input signals to said first summing means, means to apply the output of said first summing means to the input of said second summing means, means to apply a reference signal to the input of said third summing means, signal multiplying and dividing means, means to apply the output signal of said second summing means to the input of said multiplying and dividing means, means to apply a reference signal to said signal multiplying means to multiply same by the output of said second summing means to form a product, means to apply a third input signal to said signal multiplying and dividing means to divide said product by said third input signal to form a quotient signal, means to apply said quotient signal to said third summing means, and means to apply a reference signal to said third summing means.

17. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means to divide said first signal by a second signal to establish a third signal, analysis means communicating with said first conduit means, means responsive to said third signal and the output of said analysis means to control the flow through said fourth conduit means, means to sum said first and second signals to establish a fourth signal, means to sense the rate of flow through said second conduit means and to establish a fifth signal which is representative of such rate of flow, means to substract said fifth signal from said fourth signal to establish a sixth signal, means to divide said sixth signal by said fourth signal to establish a seventh signal, means to sense the rate of flow through said first conduit means and to establish an eighth signal which is representative of such rate of flow, and means responsive to said fifth, seventh and eighth signals and the output of said analysis means to control said means to supply heat to said column.

18. The control system of claim 17 further comprising means connected to the lower region of said column to sense the liquid level in said column and to establish a ninth signal representative thereof, means responsive to said ninth signal to establish a tenth signal which is the derivative of said ninth signal with respect to time, and means to add said tenth signal to said sixth signal, the difference being employed as said sixth signal which is then divided by said fourth signal.

19. In a system to separate fluid mixtures, which system includes a fractionation column, first conduit means communicating with said column to introduce a fluid mixture to be separated, means to supply heat to the lower region of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, means to sum said first and second signals to establish a third signal, flow control means connected to said fourth conduit means, said flow control means having an adjustable set point means therein, means to actuate said flow control means responsive to said third signal, means to sense the rate of flow through said fourth conduit means and to establish a fourth signal which is representative of such rate of flow, means responsive to said fourth signal to actuate said set point to reset same whenever said fourth signal exceeds preselected limits, means responsive to said first and second signals to establish a fifth signal which is representative of the rate of flow of liquid downwardly through the lower region of said column, means to sense the rate of flow through said second conduit means and to establish a sixth signal which is representative of such rate of flow, and means responsive to said fifth and sixth signals to control said means to supply heat so as to tend to maintain the ratio of said sixth signal to said fifth signal constant at a preselected value.

20. In a system to separate fluid mixtures, which system includes a fractionation column, first conduit means communicating with said column to introduce a fluid mixture to be separated, means to maintain a temperature differential between the lower and upper regions of said column, second conduit means communicating with the lower region of said column to withdraw a first stream, third conduit means communicating with the upper region of said column to withdraw a second stream, and fourth conduit means to return a portion of the second stream to said column as external reflux; a control system comprising first means to sense the rate of flow of said external reflux, second means to sense the difference in temperature between the material withdrawn from the column through said third conduit means and the external reflux returned to said column, third means responsive to said first and second means to establish a first signal which is representative of the rate of flow of internal reflux in said column, fourth means to sense the rate of flow of said feed mixture, fifth means to sense the difference between the temperature of the material in the column at the region of said introduction and the temperature of the feed mixture introduced into the column, sixth means responsive to said fourth and fifth means to establish a second signal which is representative of the rate of flow of internal feed in said column, seventh means responsive to said first and second signals to establish a third signal which is representative of the rate of flow of liquid downwardly through the lower region of said column, eighth means to sense the rate of flow through said second conduit means and to establish a fourth signal which is representaive of such rate of flow, ninth means responsive to said third and fourth signals to regulate the temperature differential between the lower and upper regions of said column so as to tend to maintain the ratio of said third signal to said fourth signal constant at a preselected value, flow control means connected to said fourth conduit means, said flow control means having an adjustable set point means therein, means responsive to said first signal to actuate said flow control means, and means responsive to said first means to actuate said set point to reset same whenever the rate of flow of said external reflux exceeds preselected limits.

References Cited by the Examiner
UNITED STATES PATENTS

| | | | |
|---|---|---|---|
| 2,414,371 | 1/1947 | Fragen et al. | 202—206 X |
| 2,453,025 | 11/1948 | Docksey | 202—160 X |
| 2,541,277 | 2/1951 | Omberg et al. | 235—151 |
| 2,664,245 | 12/1953 | O'Connor et al. | 196—132 X |
| 2,881,235 | 4/1959 | Van Pool | 196—132 X |
| 2,934,267 | 4/1960 | Wirkler et al. | 235—151 |
| 2,960,268 | 11/1960 | Chope et al. | 235—193 |
| 2,978,178 | 4/1961 | Patterson | 235—193 |
| 2,985,565 | 5/1961 | Bellinger | 196—132 |
| 3,002,818 | 10/1961 | Berger | 235—197 XR |
| 3,018,229 | 1/1962 | Morgan | 23—151 XR |
| 3,020,213 | 2/1962 | Lupfer | 202—206 XR |

FOREIGN PATENTS 1,177,743   4/1959   France.

NORMAN YUDKOFF, *Primary Examiner.*

WALTER W. BURNS, JR., *Examiner.*